United States Patent [19]

Koishi

[11] Patent Number: 4,917,492
[45] Date of Patent: Apr. 17, 1990

[54] SPECTRUM MEASURING APPARATUS

[75] Inventor: Musubu Koishi, Shizuoka, Japan

[73] Assignee: Hamamatsu Photonics Kabushiki Kaisha, Shizuoka, Japan

[21] Appl. No.: 280,763

[22] Filed: Dec. 6, 1988

[30] Foreign Application Priority Data

Jun. 21, 1988 [JP] Japan .................................. 63-153317

[51] Int. Cl.$^4$ .............................................. G01J 3/02
[52] U.S. Cl. ..................................... 356/300; 356/305; 356/328
[58] Field of Search ............... 356/300, 302, 303, 305, 356/326, 328

[56] References Cited

U.S. PATENT DOCUMENTS 3,260,180  7/1966  Teeple, Jr. ........................... 356/305
3,363,525  1/1968  Teeple, Jr. ........................... 356/305

Primary Examiner—F. L. Evans
Attorney, Agent, or Firm—Finnegan, Henderson, Farabow, Garrett and Dunner

[57] ABSTRACT

In addition to obtaining a spectrum of a measuring spot of an object, a spectrum measuring apparatus comprises a TV camera for picking-up a total image of the object. Signals corresponding to the spectrum and the total image are superposed so that the spectrum and the total image are displayed on a screen of a TV monitor at the same time.

7 Claims, 2 Drawing Sheets

SPECTRUM MEASURING APPARATUS

BACKGROUND OF THE INVENTION

The present invention relates to a spectrum measuring apparatus for measuring a color (obtaining spectral data) of part of an object.

A conventional spectrum measuring apparatus shown in FIG. 4 operates as follows: An image of an object 1 under measurement is formed on an aperture 3 by means of an object lens 2; a light beam which originates from a measuring spot 4 and has been extracted by the aperture 3 is provided through a lens 5 to a spectroscope means 6 consisting of a prism, a diffraction grating, a color filter, or the like to disperse the light beam into spectral components; the light beam from the spectroscope means is provided through a lens 7 to a detector 8 consisting of a line sensor, a silicon photocell, or the like so as to be detected thereby; the detected light beam is processed by a data processing circuit 9; and then a resultant spectral characteristics is displayed on a display device 10.

In the apparatus described above, such an adjustment as a positional adjustment of the measuring spot 4 of the object 1 is performed by splitting an incident light beam by a half-mirror 11 and observing the split light beam with the naked eye through an optical finder 15 consisting of a pellicle 12, a reflection mirror 13, an eyepiece 14 and other elements.

However, the conventional spectrum measuring apparatus, in which the object 1 is observed through the optical finder 15, has following problems:

(1) The actual operation of positional adjustment of the measuring spot 4 while observing the spot by the naked eye is very difficult to perform.

(2) It is difficult to monitor the object 1 and the measurement result at the same time and obtain accurate measurement results.

(3) The installation place of the apparatus is restricted to the places where one can enter to observe the object 1 by his naked eye.

(4) Plural persons cannot observe the optical finder 15 at the same time.

SUMMARY OF THE INVENTION

An object of the present invention is therefore to provide a spectrum measuring apparatus which can solve the above described problems.

A spectrum measuring apparatus of the invention is a type in which a light beam from a measuring spot is extracted by a measuring spot extraction device from an object image formed by an object lens, a light beam from the extracted measuring spot is dispersed into spectral components by a spectroscope means, and the spectrum data are displayed on a display device; and the apparatus comprises: a splitting means for splitting an incident light beam which is disposed before the measuring spot extraction means, a camera means for picking-up a total image of an object by using a split light beam from the splitting means, a signal superposing circuit for superposing signals corresponding to the total image picked-up by the camera means and the spectrum data dispersed by the spectroscope means on each other in order to display those on a screen of the display device at the same time.

The object image is formed on the measuring spot extraction device by the object lens. The light beam from the measuring spot which has been extracted by the measuring spot extraction device is dispersed into spectral components and the one-dimensional spectrum is detected by a multi-channel detector or the like. By using the other light beam from the splitting means, the total image of the object is formed on the camera means. The electric signals corresponding to the total image of the object picked-up by the camera means and the one-dimensional spectrum of the light beam extracted by the measuring spot extraction device are superposed on each other by the signal superposing circuit and the superimposed picture is displayed on the screen of the display device at the same time. A marker corresponding to a position and size of the measuring spot is also displayed being superimposed on the above-obtained picture.

Other and further objects, features and advantages of the invention will appear more fully from the following description taken in connection with the accompanying drawings.

DETAILED DESCRIPTION OF THE PREFERRED EMBODIMENTS

Figure 4:
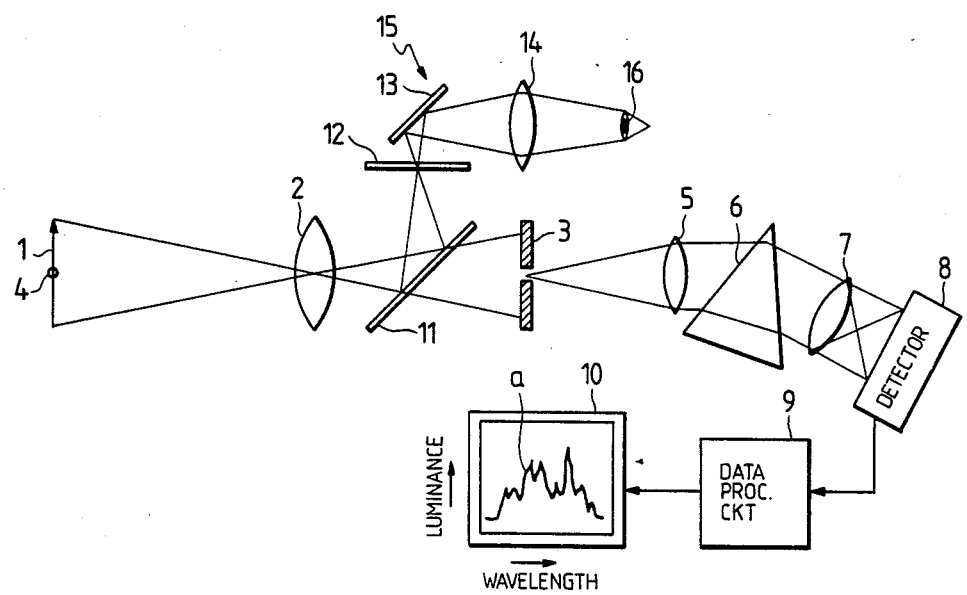
FIG. 4 is a block diagram showing a conventional spectrum measuring apparatus.

The first embodiment of the invention will be described hereinafter with reference to FIG. 1, where the same parts as those in FIG. 4 are designated by the same reference numerals.

Figure 1:
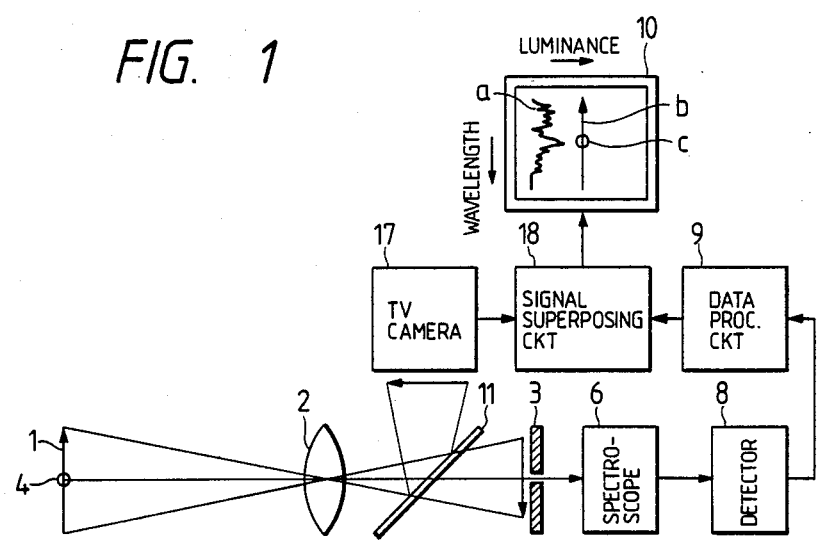
FIG. 1 is a block diagram showing a spectrum measuring apparatus according to the first embodiment of the invention.

In FIG. 1, the reference numeral 1 denotes an object to be measured and the numeral 2 denotes an object lens. After the object lens 2 is disposed a half-mirror 11 as a splitting means. At a transmission side and a reflection side of the half-mirror 11 are disposed an aperture 3 as a measuring spot extraction device and a TV camera 17 as a camera means, respectively. After the aperture 3 is disposed a data processing circuit 9 through a spectroscope means 6 such as a prism, diffraction grating, color filter, or the like, and a multi-channel detector 8 such as a video line sensor, silicon photocell array, or the like. The data processing circuit 9 and the TV camera 17 are connected to a TV monitor device 10 as a display device through a signal superposing circuit 18.

With the foregoing constitution, a light beam from the object 1 is provided to the half-mirror 11 through the object lens 2. Part of the light beam is transmitted from the half-mirror 11 and is imaged on the aperture 3 by the object lens 2. The other part of the light beam is reflected from the half-mirror 11 and imaged on the TV camera 17 also by the object lens 2.

The transmitted light beam from the aperture 3 which originates from the measuring spot 4 is dispersed into spectral components by the spectroscope means, and a one-dimensional spectrum of the transmitted light beam is detected by the multi-channel detector 8. The signal corresponding to the one-dimensional spectrum is provided to the signal superposing circuit 18 through the data processing circuit 9.

The signal corresponding to the total image b of the object 1 which was picked-up by the TV camera 17 is also sent to the signal superposing circuit 18.

The signals corresponding to the object image b and the one-dimensional spectrum or data analyzing result as are mixed in the signal superposing circuit 18, and these are displayed on the screen of the TV monitor device 10 at the same time. FIG. 1 shows an example displayed on the screen of the TV monitor device 10, where in a right half is displayed the object image b on which a marker c indicating a position and size of the measuring spot is superimposed, and in a left half is displayed a spectral characteristic curve.

Figure 2:
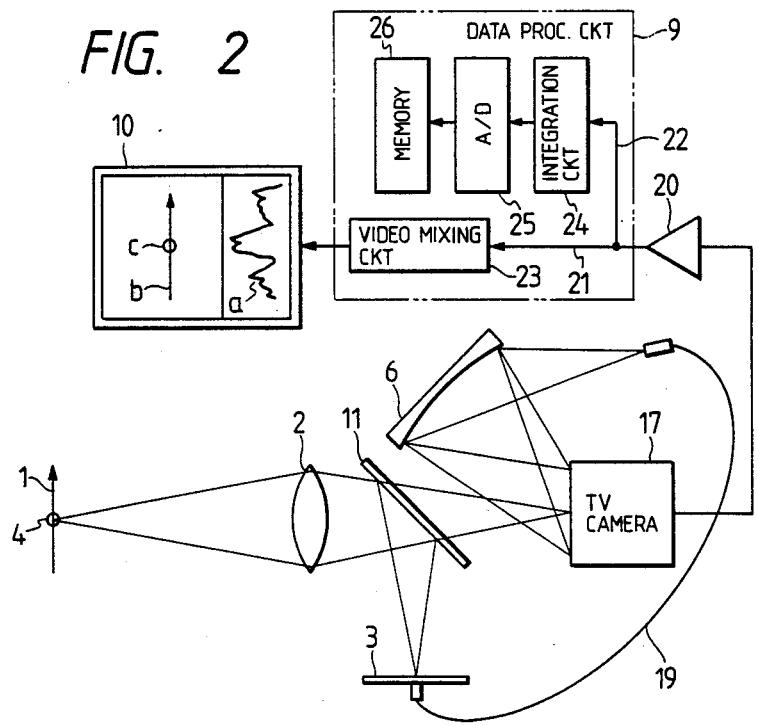
FIG. 2 is a block diagram showing the second embodiment of the invention.

The second embodiment of the invention will be hereinafter described with reference to FIGS. 2 and 3.

In this embodiment, in contrast with the first embodiment, an aperture 3 as the measuring spot extraction device is disposed at a reflection side of a half-mirror 11, and a TV camera 17 consisting of a CCD solid state picking-up device which acts as both the camera means and the signal superposing circuit is disposed at a transmission side of the half-mirror 11. An optical fiber or an optical guide 19 is connected to the aperture 3 to transmit a light beam existing in a center portion of the aperture 3 to the spectroscope means 6. An output side of the TV camera 17 is connected to a TV monitor device 10 through an amplifier 20 and a data processing circuit 9. In the data processing circuit 9 the signal line branches into an image data line 21 and a spectral data line 22. The image data line 21 is directly connected to a video mixing circuit 23, and the spectral data line 22 is also connected to the video mixing circuit 23 through an integration circuit 24, an A/D conversion circuit 25 and a memory 26.

Figure 3:
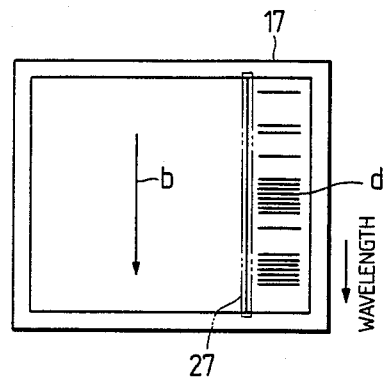
FIG. 3 is a front view showing an example of an image to be picked-up by a TV camera.

With the above constitution, a total image b of an object 1 is formed by an object lens 2 on a left half of a photodetecting surface of the TV camera 17 as shown in FIG. 3 through a transmission light beam from the half-mirror 11. On the other hand, a reflection light beam from the half-mirror 11 is imaged on the aperture 3, and part of the light beam which corrersponds to a measuring spot 4 is extracted thereby to be introduced to the spectroscope means 6 by the optical fiber or an optical guide 19. The extracted light beam is dispersed into spectral components by the spectroscope means 6 and the resultant spectrum is imaged on a right half of the photodetecting surface of the TV camera 17. An interruption plate 27 or the like is placed between the two optical systems in order to prevent the object image b and the spectrum d from being superimposed on each other on the photodetecting surface of the TV camera 17.

A video signal outputted from the TV camera 17 which has been obtained in accordance with the abovedescribed constitution is provided to the data processing circuit 9. The spectral data signal is passed through the spectral data line 22, integrated by the integration circuit 24, converted into a digital signal by the A/D conversion circuit 25, and stored in the memory 26. The image data signal is, on the other hand, passed through the image data line 21, and sent to the video mixing circuit 23 to be mixed with the spectral data signal. The mixed data are used to display the object image b and the spectral characteristic curve a on the left half and the right half, respectively, with a marker c being superimposed on the object image b.

Although in the above second embodiment the light beam from the measuring spot is imaged on the photodetecting surface of the TV camera 17 after being dispersed into spectral components by the spectroscope means, the invention is not limited to this constitution. That is, filter strips with different color characteristics may be arranged on the photodetecting surface of the TV camera 17 and parallel light beams from the measuring spot 4 may be directly made incident on the photodetecting surface through the filter strips.

Moreover, the marker C which indicates the position and area of the measuring spot 4 may be formed on the photodetecting surface of the TV camera 17 by using some optical means, may be created electronically by the data processing circuit 9, or may be formed on a CRT of the TV monitor device 10 by simply marking it.

The spectrum measuring apparatus of the invention with the foregoing constitution has following advantages:

(1) As the object under measurement and the analyzed results can be observed on the TV monitor device as the display device at the same time, the adjustment operation can be easily performed and the accurate measurement results can be obtained.

(2) It is not inhibited to install the apparatus at the place where one cannot enter.

(3) Plural persons can observe the TV monitor device as the display device at the same time.

(4) More specific advantages are as follows:

Quantitative color measurement of specific part of a painting can be performed by adjusting the view to the position to be measured while monitoring it by the TV camera (black and white, or color camera) and measuring the chromaticity from the spectrum or intensity of three primary colors of that part.

While the view adjustment operation is easily performed by virtue of the employment of TV camera, there obtained is an advantage in, for example, measuring the color of man's face. That is, in the case of using TV camera the object person hardly feels discomfort originating his awareness of being observed, in contrast with the case where he is directly observed by the finder form the right front.

Moreover, in a factory the invention can be widely applied to various ranges. For example, the view adjustment can be performed with remotely controlling the TV camera.

What is claimed is:

1. A spectrum measuring apparatus, comprising:
   lens means for forming an image of an object on measuring spot extraction means and on camera means;
   said measuring spot extraction means for extracting a light beam originating from a measuring spot of said object;
   spectroscope means for dispersing said extracted light beam into a spectrum;
   said camera means for picking-up a total image of said object;
   signal superposing means for superposing signals corresponding to said spectrum and said total image on each other and generating superposed video signal; and
   display means for displaying said spectrum and said total image on the basis of said superposed video signal.

2. A spectrum measuring apparatus as claimed in claim 1, wherein said measuring spot extraction means is an aperture, said camera means is a TV camera, said display means is a TV monitor device, and said spectrum and said total image is displayed on a screen of said TV monitor device at the same time.

3. A spectrum measuring apparatus as claimed in claim 1, further comprising a splitting means for splitting a light beam from said object into a first light beam to be imaged on said measuring spot extraction means and a second light beam to be imaged on said camera means.

4. A spectrum measuring apparatus, comprising:
measuring spot extraction means for extracting a portion of a light beam originating from a measuring spot of an object;
spectroscope means for dispersing said extracted light beam into a spectrum;
optical means for imaging said spectrum and a total image of said object on a photodetecting surface of camera means;
said camera means for picking-up said spectrum and said total image and generating a superposed video signal; and
display means for displaying said spectrum and said total image on the basis of said superposed video signal.

5. A spectrum measuring apparatus as claimed in claim 4, wherein said measuring spot extraction means is an aperture, said camera means is a TV camera, said display means is a TV monitor device, and said spectrum and said total image is displayed on a screen of said TV monitor device at the same time.

6. A spectrum measuring apparatus as claimed in claim 4, further comprising a splitting means for splitting said light beam into a first light beam to be imaged on said measuring spot extraction means and a second light beam to be imaged on said camera means.

7. A spectrum measuring apparatus as claimed in claim 4, wherein said optical means comprises an optical fiber or an optical guide for introducing said extracted light beam to said spectroscope means.

* * * * *